3,558,458
PREPARATION OF AROMATIC ACIDS
Herman S. Bloch, Skokie, Ill., assignor to Universal Oil Products Company, Des Plaines, Ill., a corporation of Delaware
No Drawing. Filed Feb. 12, 1968, Ser. No. 704,564
Int. Cl. B01j 1/10; C07c 63/00
U.S. Cl. 204—158                    9 Claims

ABSTRACT OF THE DISCLOSURE

Aromatic acids are prepared by treating an alkyl aryl ketone with water at an elevated temperature in the presence of a reaction promoting agent. The reaction promoting agent may comprise an alkaline catalyst, a transistion metal salt, or actinic light.

SPECIFICATION

This invention relates to a process for the preparation of aromatic acids. In particularly, the present invention is concerned with a process for treating an alkyl aryl ketone with water in the presence of certain reaction promoting agents at elevated temperatures to prepare the desired product.

Certain aromatic acids will find a wide variety of uses in the chemical field. For example, terephthalic acid is used as an intermediate in the production of synthetic resins, fibers, and films by combining the acid with various glycols. This is the most important intermediate inasmuch as the use of synthetic fibers and fabrics as replacements for naturally occurring fabrics such as cotton, wool, linen, etc. has increased to a great extent over the past years. Another similar aromatic acid, namely, phthalic acid (o-phthalic acid) is also an important chemical intermediate being used in the preparation of dyes such as in the synthesis of indigo, the manufacture of phthaleins, variations of fluorescein and eosine dyes, as well as in the manufacture of rhodamines and other dyes. Other uses for phthalic acid are as an intermediate in the preparation of certain pharmaceuticals and in synthetic perfumes. A simple aromatic acid such as benzoic acid may be used as intermediate in the preparation of benzoates, for seasoning tobacco and improving the aroma of the tobacco, as a mordant in calico printing, as an intermediate in the preparation of flavors, perfumes, dentifrices, food packaging, in textiles, dyes, or as a plasticizer and resin intermediate. Another aromatic acid would be naphthoic acid which may be used as an intermediate in the preparation of salts which are oil soluble and thus may be used as driers in paint formulations.

It is therefore an object of this invention to provide a novel method for the preparation of aromatic acids.

A further object of this invention is to provide a novel method for preparing aromatic acids utilizing an alkyl aryl ketone as the starting material thereof.

In one aspect an embodiment of this invention resides in a process for the preparation of an aromatic acid which comprises treating an alkyl aryl ketone with water at an elevated temperature in the presence of a reaction promoting agent, and recovering the resultant aromatic acid.

A specific embodiment of this invention resides in a process for the preparation of an aromatic acid which comprises treating methyl p-tolyl ketone with water at a temperature in the range of from about 200° to about 400° C. in the presence of sodium hydroxide, and recovering the desired p-toluic acid.

Other objects and embodiments will be found in the following further detailed description of the present invention.

As hereinbefore set forth, the present invention is concerned with a process for preparing aromatic acids by heating an alkyl aryl ketone in the presence of water and a reaction promoting agent. While various types of aromatic acids may be prepared according to the process of this invention, the methyl aryl ketones are especially preferred inasmuch as they may be economically prepared by acetylation of the aromatic compound or by oxidation of ethylated aromatic compounds. Specific examples of alkyl aryl ketones which may be used as the starting material in the present process include methyl phenyl ketone, methyl naphthyl ketone, methyl o-tolyl ketone, methyl m-tolyl ketone, methyl p-tolyl ketone, methyl o-hydroxyphenyl ketone, methyl m-hydroxyphenyl ketone, methyl p-hydroxyphenyl ketone, methyl o-aminophenyl ketone, methyl m-aminophenyl ketone, methyl p-aminophenyl ketone, methyl o-ethylphenyl ketone, methyl m-ethylphenyl ketone, methyl p-ethylphenyl ketone, methyl o-propylphenyl ketone, methyl m-propylphenyl ketone, methyl p-propylphenyl ketone, methyl 2,3-dimethylphenyl ketone, methyl 2,4-dimethylphenyl ketone, methyl 4-methyl-2-naphthyl ketone, methyl 3-methyl-2-naphthyl ketone, methyl 4-methyl-2-naphthyl ketone, ethyl phenyl ketone, ethyl naphthyl ketones, ethyl o-tolyl ketone, ethyl m-tolyl ketone, ethyl p-tolyl ketone, ethyl o-hydroxyphenyl ketone, ethyl m-hydroxyphenyl ketone, ethyl p-hydroxyphenyl ketone, ethyl o-aminophenyl ketone, ethyl m-aminophenyl ketone, ethyl p-aminophenyl ketone, ethyl o-ethylphenyl ketone, ethyl m-ethylphenyl ketone, ethyl p-ethylphenyl ketone, ethyl o-propylphenyl ketone, ethyl m-propylphenyl ketone, ethyl p-propylphenyl ketone, ethyl 2,3-dimethylphenyl ketone, ethyl 2,4-dimethylphenyl ketone, ethyl methylnaphthyl ketones, propyl phenyl ketone, propyl o-tolyl ketone, propyl p-tolyl ketone, propyl m-hydroxyphenyl ketone, propyl o-aminophenyl ketone, propyl p-aminophenyl ketone, propyl m-ethylphenyl ketone, propyl o-propylphenyl ketone, propyl p-propylphenyl ketone, propyl 2,4-dimethylphenyl ketone, propyl methylnaphthyl ketones, etc. It is to be understood that the aforementioned alkyl aryl ketones are only representative of the class of compounds which may be used, and that the present invention is not necessarily limited thereto.

As hereinbefore set forth, the present invention is effected at an elevated temperature, preferably a temperature in the range of from about 200° C. to about 400° C. in the presence of an equimolar amount of water. In addition, the reaction is effected in the presence of a reaction promoting agent. This reaction promoting agent may comprise a catalytic amount of an alkaline substance such as sodium carbonate, potassium carbonate, lithium carbonate, rubidium carbonate, cesium carbonate, sodium borate, potassium borate, lithium borate, rubidium borate, cesium borate, sodium hydroxide, potassium hydroxide, lithium hydroxide, rubidium hydroxide, cesium hydroxide, sodium phosphate, potassium phosphate, lithium phosphate, rubidium phosphate, cesium phosphate, sodium acetate, potassium acetate, lithium acetate, rubidium acetate, cesium acetate, sodium methylate, potassium methylate, lithium methylate, sodium ethylate, potassium ethylate, etc.; or a transition metal salt such as cuprous chloride, cuprous bromide, ferrous chloride, ferrous bromide, cobaltous chloride, cobaltous bromide, nickelous chloride, nickelous bromide, etc. In addition, it is also contemplated within the scope of this invention that the reaction promoting agent may include actinic light, the particular light source of energy sufficient to induce the particular reaction of interest. The actinic light may be from a light source which is in a wave length less than the visible spectrum, e.g. in the ultraviolet range. One particular light source which may be utilized comprises a medium pressure mercury-arc lamp. These lamps usually contain a specific amount of mercury vapor and a large amount of rare gas, the total pressure being above atmospheric.

These mercury-arc lamps possess strong emission lines of 2.537 A, 2.900 A, and 3,660 A, among others. Other light sources which may be used include a low pressure mercury-arc lamp in which the mercury vapor and the rare gas have a total pressure less than atmospheric or a specifically prepared fluorescent light which will also emit energy at a desired wave length, for example, a large portion of the light emitted possessing a wave length not higher than 3,700 A. It is to be understood that these light sources are only representative and that other light sources that will emit energy at other wave lengths sufficient to initiate or promote the reaction in which the alkyl aryl ketone is treated with water to prepare the desired aromatic acid may also be used.

The process of this invention may be effected in any suitable manner and may comprise either a batch or continuous type of operation. For example, when a batch type operation is used, a quantity of the alkyl aryl ketone and water are placed in an appropriate apparatus. This apparatus may comprise a flask provided with heating and reflux means if the reaction is to be effected at atmospheric pressure. However, if so desired, the reaction may also be effected at superatmospheric pressures thereby necessitating the use of a different type of apparatus such as a rotating or mixing autoclave. In the event that superatmospheric pressures are used, the pressure may be provided for by charging a substantially inert gas such as nitrogen into the autoclave, the pressure used being in a range of from about 2 to about 100 atmospheres. The amount of pressure used is that which is sufficient to maintain a major portion of the reactor in the liquid phase. In the preferred embodiment of the invention, the apparatus will contain a reaction promoting agent of the type hereinbefore set forth comprising an alkaline substance or a transition metal salt. However, if actinic light is used as the reaction promoting agent, the treatment of the alkyl aryl ketone with water will be effected in a suitable apparatus consisting of glass, quartz, or a synthetic material known in the trade as Vycor. The apparatus and contents thereof are heated to the desired reaction temperature which is in a range of from about 200° to about 400° C. and maintained thereat for a predetermined residence time which may range from about 0.5 up to about 10 hours in duration. Upon completion of the desired residence time, the apparatus and contents thereof are allowed to cool to room temperature and, in the event that superatmospheric pressures have been used, the apparatus is de-pressured. The reaction mixture is recovered and separated from any catalysts which may be present. The organic portion is separated from the water portion of the mixture, extracted, and subjected to fractional distillation or any other separation means known in the art, whereby the aromatic acid comprising the desired product is separated and recovered from any unreacted alkyl aryl ketone and/or side reaction products which may have been formed during the reaction.

It is also contemplated within the scope of this invention that the treatment of the alkyl aryl ketone with water may be affected in a continuous manner of operation. When such a type of operation is used, the alkyl aryl ketone and water are continuously charged to a reaction zone which is maintained at the proper operating conditions of temperature and pressure, the apparatus containing, if so desired, a catalytic amount of an alkaline substance or the transition metal salt. The alkyl aryl ketone and the water are charged to the reactor through separate lines or, if so desired, may be admixed prior to entry into said reactor and charged thereto through a single stream. Conversely, if the reaction promoting agent is to be an actinic light from a source of the type hereinbefore set forth in greater detail, the reactor will comprise glass, quartz, or Vycor in order that the reaction mixture may be irradiated by energy from the aforesaid light source. Upon completion of the desired residence time, the reactor effluent is continuously withdrawn and subjected to a separation step whereby the desired aromatic acid is separated from any unreacted alkyl aryl ketone and water, the latter two compounds being recycled to the reaction zone to form a portion of the feed stock.

Examples of aromatic acids which may be prepared according to the process of this invention include benzoic acid, o-toluic acid, m-toluic acid, p-toluic acid, naphthoic acid, 1-methyl-2-naphthoic acid, 4-methyl-2-naphthoic acid, 4-methyl-1-naphthoic acid, o-ethylbenzoic acid, m-ethylbenzoic acid, p-ethylbenzoic acid, o-aminobenzoic acid, m-aminobenzoic acid, p-aminobenzoic acid, etc. It is to be understood that the aforementioned aromatic acids are only representative of the class of compounds which may be prepared, and that the present invention is not necessarily limited thereto.

The following examples are given to illustrate the process of the present invention; however, they are not intended to limit the generally broad scope of the present invention in strict accordance therewith.

Example I

In this example, one mole of methyl p-tolyl ketone, which is prepared by the acetylation of toluene and recovery of the para-fraction, and one mole of water are placed in a reaction vessel. In addition, five grams of cuprous chloride is also placed in the vessel which is thereafter heated to a temperature of about 300° C. The reaction mixture is maintained at this temperature for a period of about four hours. At the end of this time, heating is discontinued and the vessel allowed to return to room temperature. The reaction mixture is recovered and separated from the cuprous chloride. Following this, the organic portion of the mixture is separated from the water portion and subjected to fractional distillation under reduced pressure. The p-toluic acid, which has a melting point of 179–180° C. at atmospheric pressure, is recovered from the distillation.

Example II

A mixture of one mole of methyl o-tolyl ketone, which is prepared in a manner similar to that set forth in Example I above, and one mole of water along with five grams of sodium carbonate is placed in a reaction vessel and heated to a temperature of about 300° C. while maintaining the mixture in a constantly agitated state. After a period of about four hours has passed, the vessel and contents thereof are allowed to return to room temperature. Following this, the organic portion of the mixture is separated from the aqueous portion and subjected to fractional distillation under reduced pressure. The desired product comprising o-toluic acid, having a melting point of about 104–105° C., is recovered from the distillation.

Example III

A mixture of one mole of methyl phenyl ketone, which is prepared by the acetylation of benzene, and one mole of water is placed in a reaction apparatus comprising a quartz reactor. The mixture is heated to a temperature of about 300° C. and thereafter subjected to irradiation from a medium pressure mercury-arc lamp, which has a strong emission line of 2,537 A., for a period of about four hours. At the end of this time, the irradiation and heating is discontinued and the reaction mixture is allowed to return to room temperature. The mixture is treated in a manner similar to that set forth in the above examples and after fractional distillation, the desired product comprising benzoic acid, having a melting point of about 122° C., is recovered.

Example IV

In this example, a mixture of one mole of methyl-2-naphthyl ketone and one mole of water is placed in a reaction vessel along with five grams of a catalyst comprising potassium hydroxide. The reaction mixture is then heated to a temperature of about 350° C. and maintained thereat for a period of about four hours, the mixture being constantly stirred throughout this period. At the end of this time, the reaction vessel and contents thereof are allowed to cool to room temperature and the crystals are separated from the aqueous alkyline layer. The crystals are dissolved in an organic solvent and recrystallized after removal of the solvent. The desired product comprising β-naphthoic acid is recovered therefrom.

I claim as my invention:

1. Process for the preparation of an aromatic acid which comprises reacting an alkyl aryl ketone with an equimolar amount of water at a temperature of about 200° to 400° C. in the presence of a reaction catalytic promoting agent and recovering the resultant aromatic acid.

2. The process as set forth in claim 1 further characterized in that said reaction promoting agent comprises sodium hydroxide.

3. The process as set forth in claim 1 further characterized in that said reaction promoting agent comprises cuprous chloride.

4. The process as set forth in claim 1 further characterized in that said reaction promoting agent comprises potassium acetate.

5. The process as set forth in claim 1 further characterized in that said reaction promoting agent comprises actinic light.

6. The process as set forth in claim 1 further characterized in that said alkyl aryl ketone comprises methyl p-tolyl ketone, and said aromatic acid comprises p-toluic acid.

7. The process as set forth in claim 1 further characterized in that said alkyl aryl ketone comprises methyl o-tolyl ketone, and said aromatic acid comprises o-toluic acid.

8. The process as set forth in claim 1 further characterized in that said alkyl aryl ketone comprises methyl phenyl ketone, and said aromatic acid comprises benzoic acid.

9. The process as set forth in claim 1 further characterized in that said alkyl aryl ketone comprises a methyl naphthyl ketone, and said aromatic acid comprises a naphthoic acid.

References Cited

UNITED STATES PATENTS 2,964,559  12/1960  Burney et al. _____ 260—523
3,057,915  10/1962  Riemenschneider et al.
                                        204—158

OTHER REFERENCES

Fishwick, Journal Chemical Society, March 1957, pp. 1196, 1198 and 1199.

HOWARD S. WILLIAMS, Primary Examiner

U.S. Cl. X.R.

260—523